US010250845B1

(12) United States Patent
Ahn et al.

(10) Patent No.: US 10,250,845 B1
(45) Date of Patent: Apr. 2, 2019

(54) REMOTE COLLABORATION SYSTEM WITH PROJECTOR-CAMERA BASED ROBOT DEVICE AND HEAD MOUNTED DISPLAY, AND REMOTE INTERACTION METHOD USING THE SAME

(71) Applicant: KOREA INSTITUTE OF SCIENCE AND TECHNOLOGY, Seoul (KR)

(72) Inventors: Sang Chul Ahn, Seoul (KR); Jin Uk Kwon, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 16/039,436

(22) Filed: Jul. 19, 2018

(30) Foreign Application Priority Data

Oct. 19, 2017 (KR) .................. 10-2017-0135689

(51) Int. Cl.
*H04N 7/15* (2006.01)
*H04N 7/14* (2006.01)
(Continued)

(52) U.S. Cl.
CPC ......... *H04N 7/141* (2013.01); *G06F 3/04845* (2013.01); *H04N 5/23238* (2013.01); *H04N 5/247* (2013.01)

(58) Field of Classification Search
CPC .... H04N 7/141; H04N 5/23238; H04N 5/247; G06F 3/04845
See application file for complete search history.

(56) References Cited

U.S. PATENT DOCUMENTS

2002/0191071 A1* 12/2002 Rui .................. H04N 7/142
348/14.03
2003/0216834 A1 11/2003 Allard
(Continued)

FOREIGN PATENT DOCUMENTS

KR 10-1553849 B1 9/2015
KR 10-2017-0044318 A 4/2017

OTHER PUBLICATIONS

Pavel Gurevich et al., "Design and Implementation of TeleAdvisor: a Projection-Based Augmented Reality System for Remote Collaboration", Computer Supported Cooperative Work (CSCW), 2015, pp. 527-562, vol. 24.
(Continued)

*Primary Examiner* — Stella L. Woo
(74) *Attorney, Agent, or Firm* — Rabin & Berdo, P.C.

(57) ABSTRACT

In a remote interaction method performed by a remote collaboration system comprising a robot device and a head mounted display, the robot device is located in a remote space and comprising a projector, a panoramic camera and a high resolution camera. The head mounted display is located in a local space apart from the remote space. A communication between the robot device and the head mounted display is established based on a communication request. The remote space is observed by the head mounted display based on first image information and second image information. The first image information is collected by the panoramic camera and received from the robot device. The second image information is collected by the high resolution camera and received from the robot device. Necessary information to be provided to the remote space is searched by the head mounted display based on a result of observing the remote space. The necessary information received from
(Continued)

the head mounted display is provided by the robot device to the remote space using the projector.

8 Claims, 16 Drawing Sheets

(51) Int. Cl.
*G06F 3/0484* (2013.01)
*H04N 5/247* (2006.01)
*H04N 5/232* (2006.01)

(56) References Cited

U.S. PATENT DOCUMENTS

| | | | |
|---|---|---|---|
| 2004/0189675 A1* | 9/2004 | Pretlove | B25J 9/1656 345/633 |
| 2005/0028221 A1* | 2/2005 | Liu | H04N 7/147 725/133 |
| 2016/0139766 A1* | 5/2016 | Kim | G06F 3/04817 715/802 |
| 2016/0358383 A1 | 12/2016 | Gauglitz et al. | |

OTHER PUBLICATIONS

Jin Uk Kwon et al., "Projector-camera based remote assistance system for the elderly: design issues and implementation", Proceedings of the 2016 IEEE/SICE International Symposium on System Integration, Sapporo Convention Center, Sapporo, Japan, Dec. 13-15, 2016, pp. 230-235.

* cited by examiner

US 10,250,845 B1

REMOTE COLLABORATION SYSTEM WITH PROJECTOR-CAMERA BASED ROBOT DEVICE AND HEAD MOUNTED DISPLAY, AND REMOTE INTERACTION METHOD USING THE SAME

CROSS-REFERENCE TO RELATED APPLICATION

This application claims priority under 35 USC § 119 to Korean Patent Application No. 10-2017-0135689, filed on Oct. 19, 2017 in the Korean Intellectual Property Office (KIPO), the contents of which are herein incorporated by reference in their entirety.

BACKGROUND

1. Technical Field

Example embodiments relate generally to remote collaboration technique, and more particularly to remote collaboration systems with projector-camera based robot devices and head mounted displays, and remote interaction methods performed by the remote collaboration systems.

2. Description of the Related Art

A remote collaboration system is a system in which a remote user and a local guide (or a local helper) communicate with each other to perform necessary tasks or educations. The remote user is a person who is located in a remote space and needs assistance. The local guide is a person who is located in a local space, provides assistance to the remote user and cooperates with the remote user.

Various remote collaboration systems have been implemented based on various devices. When a remote collaboration system is implemented based on a mobile device, the remote collaboration system has high accessibility because the mobile device is friendly and convenient for the remote user, however, the remote user has a problem of low task efficiency because the remote user performs a task with holding the mobile device and watching a display on the mobile device to obtain explanations from the local guide and the local guide also has a problem of difficulty in observing the remote space. When a remote collaboration system is implemented based on a wearable device, the remote user does not need to hold the wearable device, however, the remote user may feel uncomfortable with the wearable device and the local guide still has a problem of difficulty in observing the remote space. When a remote collaboration system is implemented based on a robot device, the local guide may easily observe the remote space by controlling the robot device as desired and the remote user may feel more comfortable in comparison with the wearable device and the mobile device, however, the remote user has a problem of low task efficiency because the remote user performs a task with watching a monitor on the robot device to obtain explanations from the local guide and the local guide still has a problem of difficulty in observing the remote space if a camera on the robot device has narrow angle of view.

SUMMARY

Accordingly, the present disclosure is provided to substantially obviate one or more problems due to limitations and disadvantages of the related art.

At least one example embodiment of the present disclosure provides a remote interaction method that is performed by a remote collaboration system with a head mounted display and a robot device including a projector and at least one camera capable of efficiently cooperating a remote user and a local guide with each other.

At least one example embodiment of the present disclosure provides a remote collaboration system with a head mounted display and a robot device including a projector and at least one camera capable of efficiently cooperating a remote user and a local guide with each other.

According to example embodiments, in a remote interaction method performed by a remote collaboration system comprising a robot device and a head mounted display, the robot device is located in a remote space and comprising a projector, a panoramic camera and a high resolution camera. The head mounted display is located in a local space apart from the remote space. A communication between the robot device and the head mounted display is established based on a communication request. The remote space is observed by the head mounted display based on first image information and second image information. The first image information is collected by the panoramic camera and received from the robot device. The second image information is collected by the high resolution camera and received from the robot device. Necessary information to be provided to the remote space is searched by the head mounted display based on a result of observing the remote space. The necessary information received from the head mounted display is provided by the robot device to the remote space using the projector.

In an example embodiment, in observing the remote space, a panoramic image of the remote space may be displayed by the head mounted display based on the first image information. The panoramic image and a magnified image of a first region in the remote space may be displayed by the head mounted display together based on the first image information and the second image information when a screen magnifying interaction is performed while the head mounted display displays the panoramic image. The magnified image may be displayed by the head mounted display based on the second image information when the screen magnifying interaction is performed while the head mounted display displays the panoramic image and the magnified image together. A current screen image displayed on the head mounted display is stored when a screen saving interaction is performed.

In an example embodiment, in observing the remote space, the panoramic image may be displayed by the head mounted display based on the first image information when a screen demagnifying interaction is performed while the head mounted display displays the panoramic image and the magnified image together. The panoramic image and the magnified image may be displayed by the head mounted display together based on the first image information and the second image information when the screen demagnifying interaction is performed while the head mounted display displays the magnified image.

In an example embodiment, in observing the remote space, the magnified image displayed on the head mounted display may be removed when a removing interaction is performed while the head mounted display displays the panoramic image and the magnified image together, or a user interface object displayed on the head mounted display may be removed when the removing interaction is performed while the head mounted display displays the panoramic image or the magnified image with the user interface object.

The user interface object may be used for controlling an operation of the head mounted display.

In an example embodiment, in searching the necessary information, the local space may be observed by the head mounted display based on third image information collected by a first camera included in the head mounted display when a screen demagnifying interaction is performed while the head mounted display displays the panoramic image. A first searching operation may be performed on a plurality of first data stored in the head mounted display. The necessary information may be obtained based on at least one of the result of observing the remote space, a result of observing the local space and a result of the first searching operation.

In an example embodiment, in searching the necessary information, a second searching operation may be performed on a plurality of second data stored in the robot device. A third searching operation may be performed on a plurality of third data associated with the necessary information by connecting an Internet network via the head mounted display. The necessary information may be obtained further based on at least one of a result of the second searching operation and a result of the third searching operation.

In an example embodiment, in providing the necessary information to the remote space, the necessary information may be displayed by the projector on the remote space when the necessary information is provided as an image. A pointer may be displayed by the projector on the first region in the remote space when the necessary information is associated with the first region in the remote space.

In an example embodiment, both the high resolution camera and the projector may be controlled toward the first region in the remote space when the head mounted display displays the panoramic image and the magnified image together or only the magnified image and when the necessary information is associated with the first region in the remote space and the projector displays the pointer on the first region in the remote space.

In an example embodiment, the remote collaboration system may further comprise a controller that is located in the local space and controls an operation of the head mounted display. Direction controls of the high resolution camera and the projector may be performed based on head tracking information obtained by the head mounted display. A movement of the pointer displayed on the first region in the remote space may be controlled by the controller.

According to example embodiments, a remote collaboration system comprises a robot device and a head mounted display. The robot device is located in a remote space and comprises a projector, a panoramic camera and a high resolution camera. The projector provides necessary information to the remote space. The panoramic camera collects first image information of the remote space. The high resolution camera collects second image information of the remote space. The head mounted display is located in a local space apart from the remote space. A communication between the robot device and the head mounted display is established based on a communication request. The head mounted display observes the remote space based on the first image information and the second image information. The head mounted display searches the necessary information based on a result of observing the remote space. The robot device provides the necessary information received from the head mounted display to the remote space using the projector.

In the remote interaction method and remote collaboration system according to example embodiments, the robot device including the projector and the at least one camera may be used and may be controlled by the head mounted display. Thus, the collaboration between the remote user and the local guide may be efficiently performed. For example, the remote user may feel more comfortable without holding or wearing the device, may obtain the explanations from the local guide immediately displayed on the region having problems via the projector, and thus may have improved task efficiency. The local guide may control the robot device to watch the remote space and provide the explanations as desired, and may wear the head mounted display to observe the remote space with heightened immersion. The remote collaboration may be performed with high task efficiency and without inconvenience based on the screen change, the control of the robot device, etc. according to example embodiments even if the local guide wears the head mounted display.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
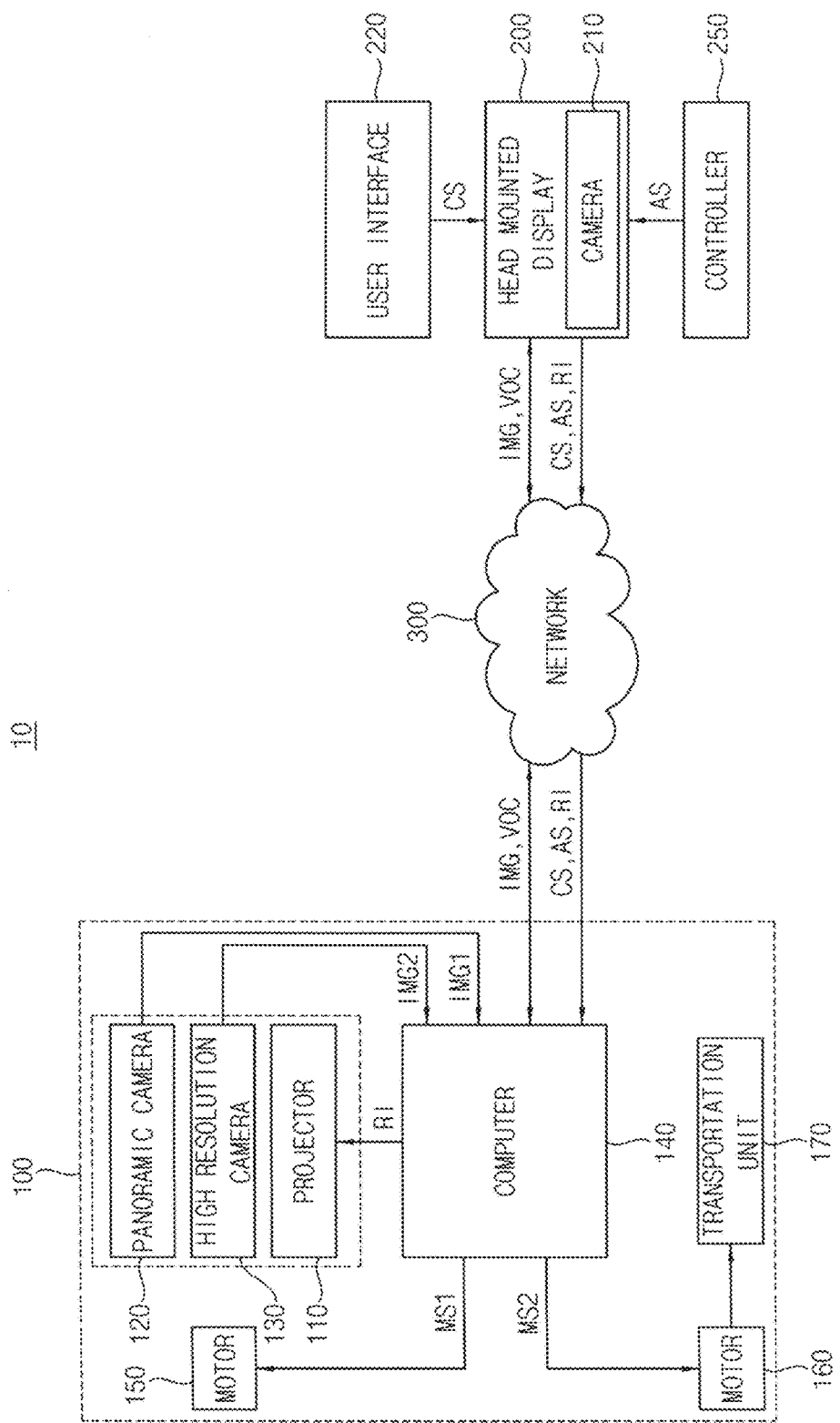
FIG. 1 is a block diagram illustrating a remote collaboration system according to example embodiments.

Various example embodiments will be described more fully with reference to the accompanying drawings, in which embodiments are shown. The present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a remote collaboration system according to example embodiments.

Referring to FIG. 1, a remote collaboration system 10 includes a robot device 100 and a head mounted display (HMD) 200. The remote collaboration system 10 may further include a controller 250.

The robot device 100 is located or disposed in a remote space and is a device which provides help, assistance, support or guidance to a remote user in the remote space. The head mounted display or head mounted display device 200 is located or disposed in a local space that is apart from the remote space and freely controls the robot device 100 regardless of any motions or movements of the remote user. A local guide or a local helper in the local space may wear the head mounted display 200. In other words, the head mounted display 200 may be controlled by the local guide.

The robot device 100 and the head mounted display 200 may communicate with each other via a network 300. For example, the robot device 100 and the head mounted display 200 may exchange image data IMG and/or voice data VOC with each other via the network 300, and the head mounted display 200 may transmit a command signal CS, an annotation signal AS, necessary information RI, etc. to the robot device 100 via the network 300.

In some example embodiments, the network 300 may include at least one of various wire/wireless communication networks. For example, the network 300 may include a WiFi communication network and/or other wireless communication networks, such as a third generation (3G) communication network, a fourth generation (4G) communication network, a long term evolution (LTE) communication network, etc.

The robot device 100 includes a projector 110, a panoramic camera 120 and a high resolution camera 130. The robot device 100 may further include a computer 140, motors 150 and 160, and a transportation unit 170. The robot device 100 may be referred to as a remote collaboration device.

The projector 110 provides the necessary information RI to the remote space (e.g., to the remote user). The necessary information RI may be obtained by the head mounted display 200 and may be transmitted from the head mounted display 200 to the projector 110 via the network 300 and the computer 140.

The panoramic camera 120 collects first image information IMG1 of the remote space. The first image information IMG1 may represent or correspond to a panoramic image or a 360 degree image of the remote space.

The high resolution camera 130 collects second image information IMG2 of the remote space. The second image information IMG2 may represent or correspond to a high resolution image or a magnified image of a specific region in the remote space. For example, an angle of view of the high resolution camera 130 may be narrower than an angle of view of the panoramic camera 120, and a resolution of the high resolution camera 130 may be higher than a resolution of the panoramic camera 120.

In some example embodiments, if the panoramic camera 120 has sufficiently high resolution to obtain the high resolution image or the magnified image of the specific region in the remote space, the high resolution camera 130 may be omitted.

The computer 140 may control overall operations of the robot device 100. For example, the computer 140 may communicate with the head mounted display 200 via the network 300, may transmit the first image information IMG1 collected by the panoramic camera 120 and the second image information IMG2 collected by the high resolution camera 130 to the head mounted display 200, may receive the necessary information RI from the head mounted display 200 to transmit the necessary information RI to the projector 110, may control the projector 110, the panoramic camera 120 and the high resolution camera 130 based on the command signal CS and/or the annotation signal AS received from the head mounted display 200, and may generate motor control signals MS1 and MS2 for controlling the motors 150 and 160.

The motor 150 may control movements of at least one of the projector 110, the panoramic camera 120 and the high resolution camera 130 based on the motor control signal MS1. For example, the motor 150 may control a projecting direction of the projector 110 or a lens direction of the high resolution camera 130. Although FIG. 1 illustrates a single motor 150 for controlling all of the projector 110, the panoramic camera 120 and the high resolution camera 130, the remote collaboration system 10 according to example embodiments may include a plurality of motors each of which controls a respective one of the projector 110, the panoramic camera 120 and the high resolution camera 130.

The motor 160 may control the transportation unit 170 based on the motor control signal MS2. A location of the robot device 100 in the remote space may be controlled based on an operation of the transportation unit 170.

The head mounted display 200 displays images such that the local guide observes the remote space based on the images displayed on the head mounted display 200. For example, the head mounted display 200 may display the panoramic image of the remote space based on the first image information IMG1, may display the high resolution image of the specific region in the remote space based on the second image information IMG2, or may display the panoramic image and the high resolution image together.

The head mounted display 200 may include a camera 210. The head mounted display 200 may display an image of the local space based on third image information collected by the camera 210.

In addition, the head mounted display 200 searches the necessary information RI that is to be provided to the remote space. Although not illustrated in FIG. 1, the head mounted display 200 may further include a processing device (e.g., a central processing unit (CPU)), a storage device (e.g., a memory), etc. for performing the searching operation.

The controller 250 may be located or disposed in the local space and may control an operation of the head mounted display 200. For example, the annotation signal AS may be transmitted to the head mounted display 200 based on a control of the controller 250. For example, the controller 250 may include a touch pad, a touch screen or a dedicated control unit for the head mounted display 200.

The command signal CS may be transmitted to the head mounted display 200 based on a control of a user interface (UI) 220. For example, the user interface 220 may include a graphic user interface (GUI) displayed on the head mounted display 200.

Although FIG. 1 illustrates an example where the command signal CS is generated by the user interface 220 and the annotation signal AS is generated by the controller 250, inventive concepts are not limited thereto. For example, the user interface 220 may generate the annotation signal AS, the controller 250 may generate the command signal CS, the command signal CS and/or the annotation signal AS may be generated based on head tracking information obtained by motions or movements of the local guide, or the command signal CS and/or the annotation signal AS may be generated while the searching operation for the necessary information RI is performed.

In the remote collaboration system 10 according to example embodiments, the local guide may observe the remote space (e.g., a remote environment) using the robot device 100 (e.g., the remote collaboration device) located at a remote user side. For example, the panoramic image or the 360 degree image of the remote space may be obtained by the panoramic camera 120 to observe the whole remote space, and the high resolution image or the magnified image of the specific region in the remote space may be obtained by the high resolution camera 130 to observe the specific region in the remote space, if necessary. Explanations of the local guide may be provided from the projector 110 to the remote space. The movements of the projector 110, the panoramic camera 120, the high resolution camera 130 and the whole robot device 100 may be controlled by the motors 150 and 160.

In addition, the local guide may wear the head mounted display 200 to feel or realize the remote space vividly, finely or with details. The local guide may observe the local space (e.g., a local environment) using the camera 210 included in the head mounted display 200. A screen and/or the graphic user interface may be implemented in the head mounted display 200, and the head tracking information and/or the controller 250 (e.g., the touch pad or the dedicated control unit) may be used for controlling the screen and/or the graphic user interface implemented in the head mounted display 200. A remote collaboration interaction may be performed based on the head mounted display 200. As will be described later, the remote collaboration interaction may include a control interaction for the head mounted display 200 (e.g., the screen and/or the graphic user interface implemented in the head mounted display 200) and a control interaction for the robot device 100.

Figure 2:
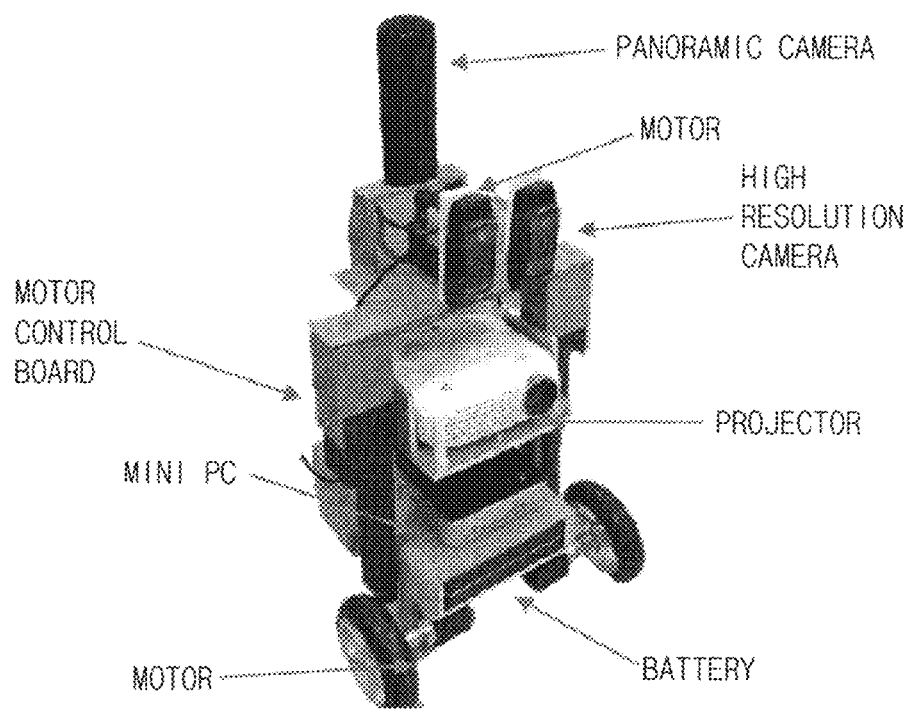
FIG. 2 is a diagram illustrating a prototype of a robot device included in a remote collaboration system according to example embodiments.

FIG. 2 is a diagram illustrating a prototype of a robot device included in a remote collaboration system according to example embodiments.

Referring to FIG. 2, a body including a plurality of receiving spaces is prepared, a projector, a panoramic camera, a high resolution camera, a mini PC (personal computer) and a motor control board are mounted on the plurality of receiving spaces, the body is equipped with motors, wheels and a battery, and thus a prototype of a robot device is manufactured. The mini PC and the wheels in FIG. 2 may correspond to the computer 140 and the transportation unit 170 in FIG. 1, respectively, and the motor control board and the battery are added for controlling the motors and supplying power to the motors, respectively.

Figure 3:
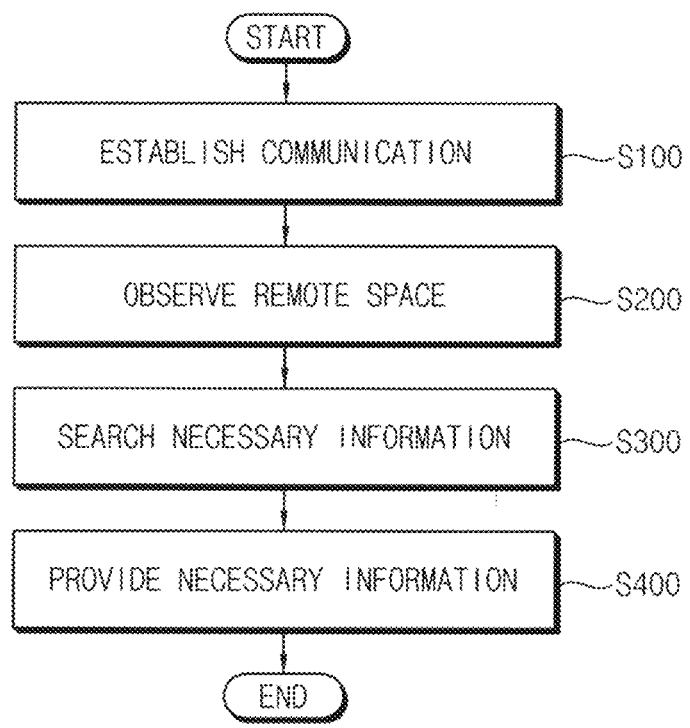
FIG. 3 is a flow chart illustrating a remote interaction method performed by a remote collaboration system according to example embodiments.

FIG. 3 is a flow chart illustrating a remote interaction method performed by a remote collaboration system according to example embodiments.

Referring to FIGS. 1 and 3, in a remote interaction method performed by the remote collaboration system 10 according to example embodiments, a communication between the robot device 100 located in the remote space and the head mounted display 200 located in the local space is established based on a communication request (step S100). The communication request may be generated by one of the robot device 100 and the head mounted display 200. For example, as will be described with reference to FIGS. 4A and 4B, the head mounted display 200 may generate the communication request based on a control of the local guide.

The head mounted display 200 receives the first image information IMG1 collected by the panoramic camera 120 and the second image information IMG2 collected by the high resolution camera 130, and the remote space is observed by the head mounted display 200 based on the first image information IMG1 and the second image information IMG2 (step S200). For example, as will be described with reference to FIGS. 7A, 7B and 7C, the head mounted display 200 may display the panoramic image of the remote space based on the first image information IMG1, may display the high resolution image of the specific region in the remote space based on the second image information IMG2, or may display the panoramic image and the high resolution image together.

The necessary information RI that is to be provided to the remote space is searched by the head mounted display 200 based on a result of observing the remote space (step S300). For example, the remote space may be observed to check, realize or detect problems in the remote space, and the necessary information RI may be searched to resolve the problems in the remote space. For example, as will be described with reference to FIG. 13, the head mounted display 200 may observe the remote space based on a control of the local guide or may search data stored in the head mounted display 200, data stored in the robot device 100 or data in an Internet network to obtain the necessary information RI.

The robot device 100 receives the necessary information RI from the head mounted display 200, and the necessary information RI is provided by the robot device 100 to the remote space using the projector 110 (step S400). For example, as will be described with reference to FIGS. 14A, 14B and 14C, the necessary information RI may be provided as an image such as a picture, a sketch, etc., or may be provided as a pointer that is indicated on the specific region in the remote space.

Figure 4A:
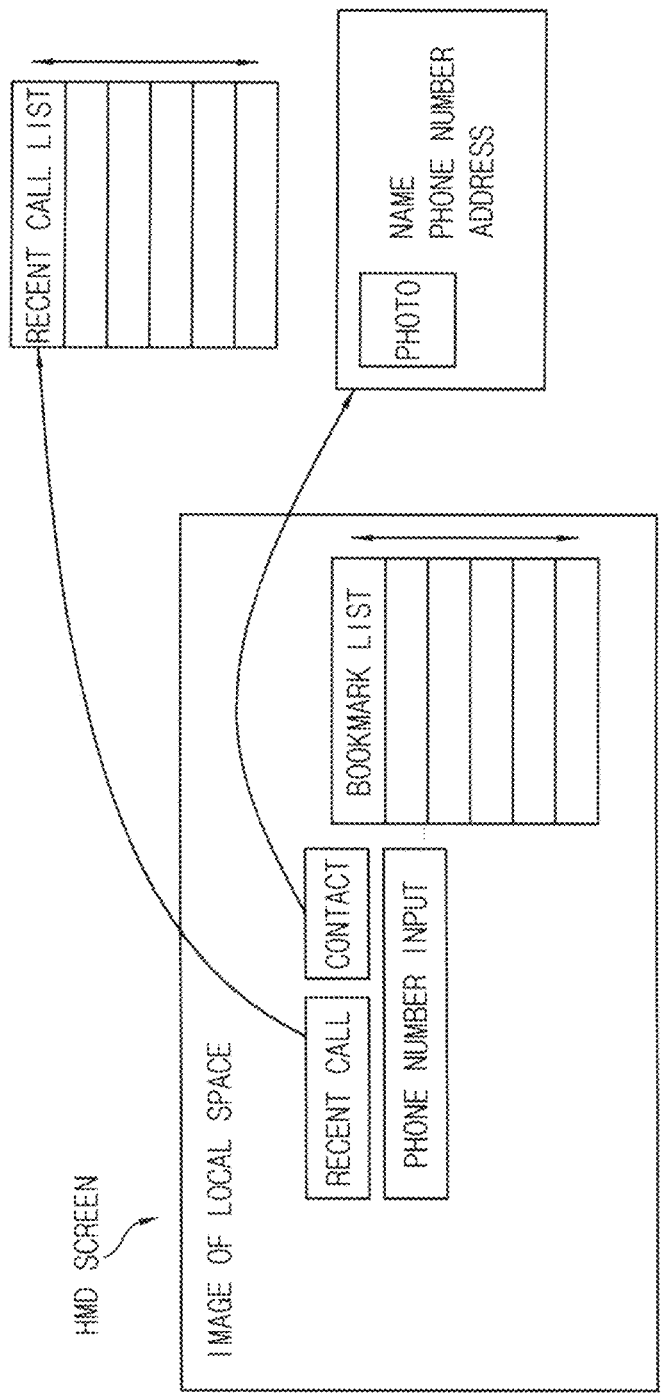
FIGS. 4A and 4B are diagrams for describing an operation associated with a communication request by a head mounted display included in a remote collaboration system according to example embodiments.
Figure 4B:
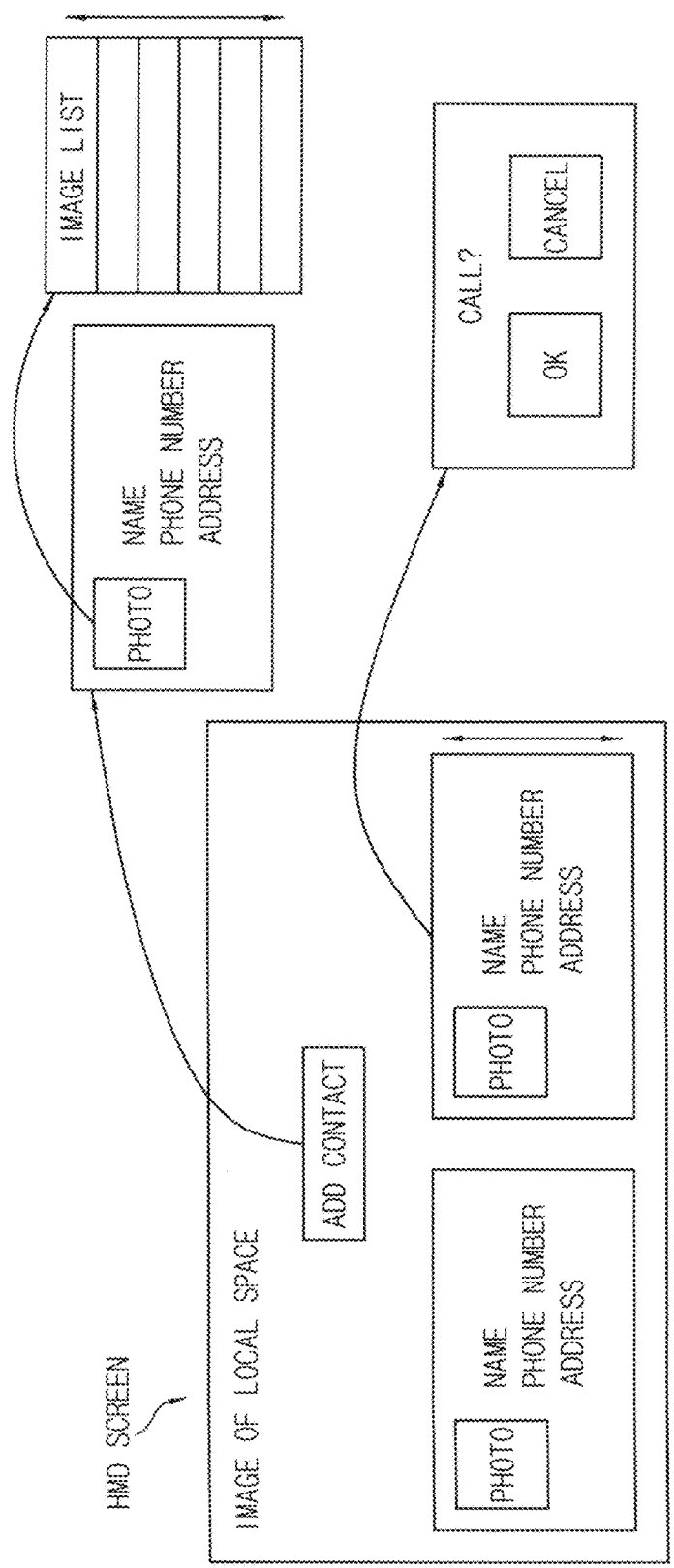

FIGS. 4A and 4B are diagrams for describing an operation associated with a communication request by a head mounted display included in a remote collaboration system according to example embodiments.

A configuration of screen GUIs of the head mounted display 200 may include a first screen GUI for the communication request and a second screen GUI after the communication between the robot device 100 and the head mounted display 200 is established. FIGS. 4A and 4B illustrate the first screen GUI for the communication request.

Referring to FIGS. 1, 4A and 4B, after the local guide wears the head mounted display 200, the head mounted display 200 may be turned on, and the remote interaction method according to example embodiments may be performed or executed. As illustrated in FIG. 4A, an initial screen of the head mounted display 200 may include the image of the local space displayed as a background. The image of the local space may be displayed based on third image information collected by the camera 210. The initial screen of the head mounted display 200 may further include a phone number input menu, a contact menu, a recent call menu and a bookmark list menu displayed as GUI forms (e.g., buttons, etc.).

Figure 5:
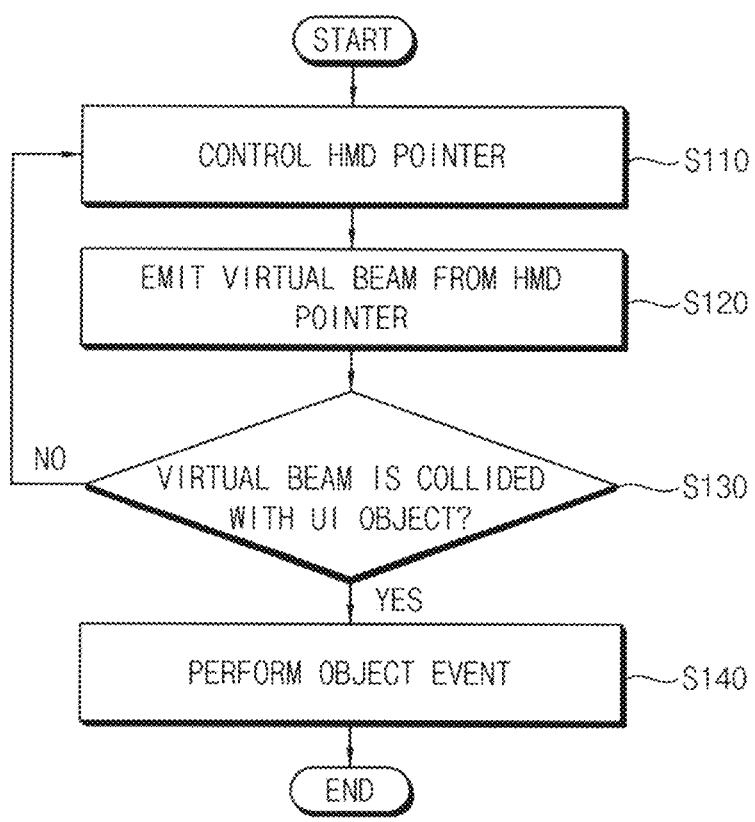
FIGS. 5, 6A, 6B and 6C are diagrams for describing an operation of performing an event by a head mounted display included in a remote collaboration system according to example embodiments.

As will be described with reference to FIG. 5, each button may be clicked using a HMD pointer to perform a corresponding function. For example, when a recent call button is clicked, a recent call list may be displayed on a screen of the head mounted display 200. When a contact button is clicked, a contact list may be displayed on a screen of the head mounted display 200. The contact list may include a plurality of contacts each of which includes a photo, a name, a phone number, an address, etc.

As illustrated in FIG. 4B, when the contact button is clicked, the contact list may be displayed. When a specific contact (e.g., a contact of the remote user having the robot device 100 in the remote space) is clicked in the contact list, a communication request screen with a message (e.g., "call?") may be displayed on a screen of the head mounted display 200. When an OK button is clicked, the communication request may be transmitted from the head mounted display 200 to the robot device 100. When the robot device 100 accepts the communication request, the communication between the robot device 100 and the head mounted display 200 may be established. In other words, step S100 in FIG. 3 may be performed by the communication request from the head mounted display 200.

When an add contact button is clicked, a screen for adding a new contact may be displayed. When a photo button is clicked, an image list for selecting an image to be added to the new contact may be displayed on a screen of the head mounted display 200.

Bidirectional arrows illustrated in FIGS. 4A and 4B may indicate a scrolling function. In other words, the bookmark list and the recent call list in FIG. 4A and the contact list and the image list in FIG. 4B may be scrolled.

FIGS. 5, 6A, 6B and 6C are diagrams for describing an operation of performing an event by a head mounted display included in a remote collaboration system according to example embodiments.

An operation of performing an event by the head mounted display 200 may indicate an operation of clicking or selecting a button or a menu in both the first screen GUI for the communication request and the second screen GUI after the communication between the robot device 100 and the head mounted display 200 is established. In other words, an operation of FIG. 5 may be performed in step S100 and may also be performed in steps S200, S300 and S400.

Figure 6A:
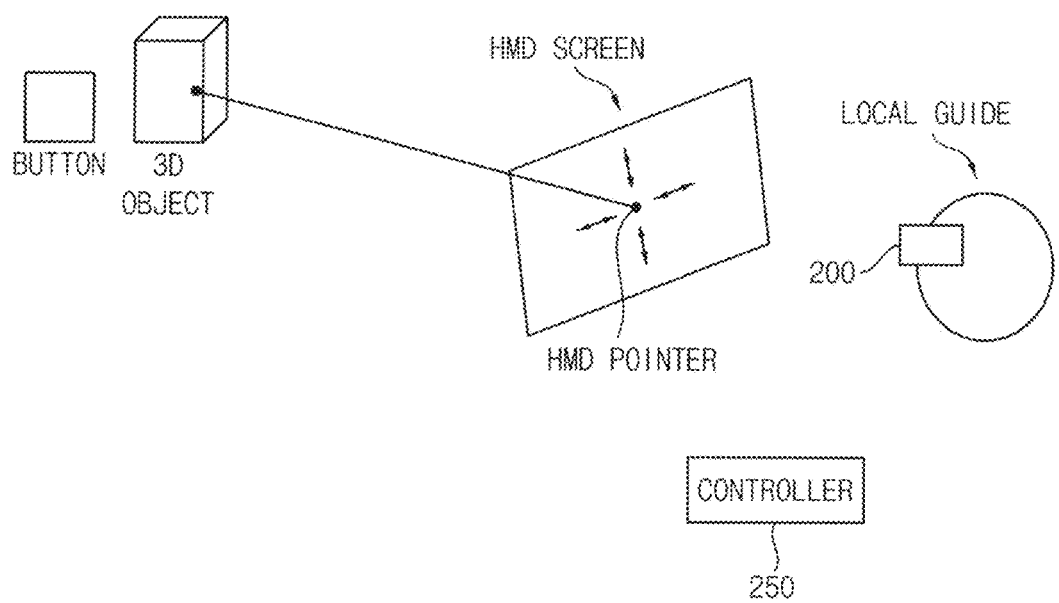
Figure 6B:
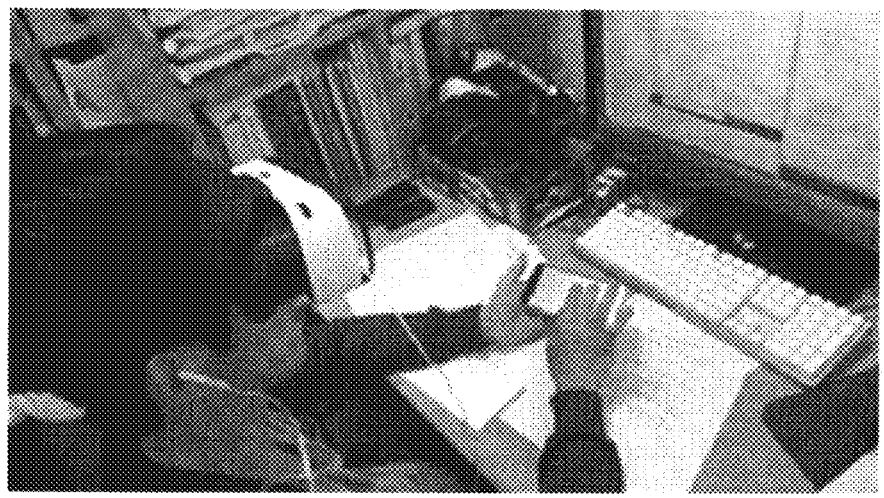
Figure 6C:
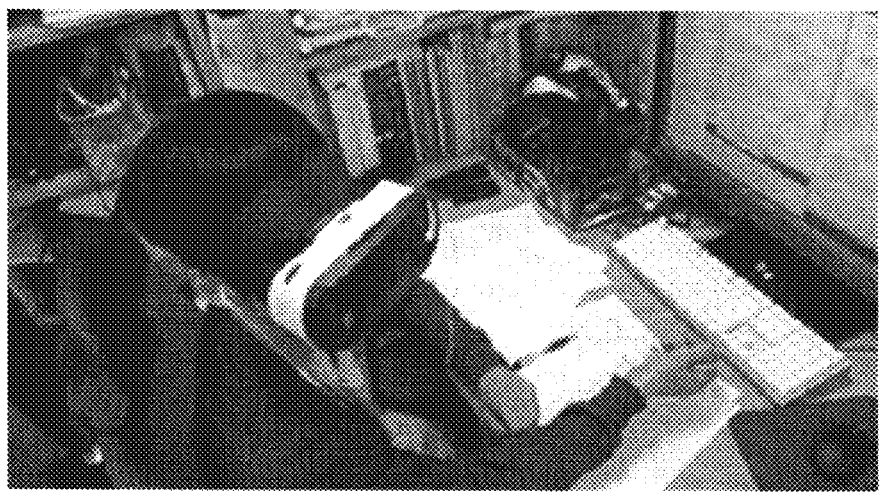

Referring to FIGS. 5, 6A, 6B and 6C, a HMD pointer may be controlled to perform a specific event such that the HMD pointer is located or disposed on a specific UI object on a screen of the head mounted display 200 (step S110). For example, when the contact button in FIG. 4A is to be clicked, the controller 250 may move the HMD pointer on the screen of the head mounted display 200 until the HMD pointer is located or disposed on the contact button. For example, the controller 250 may be a touch pad or a touch screen as illustrated in FIG. 6B, or a dedicated control unit for the head mounted display 200 as illustrated in FIG. 6C.

A click operation may be performed, and a virtual beam may be emitted from a current location of the HMD pointer toward the specific UI object (step S120). For example, the click operation may be performed by the controller 250.

When the virtual beam is not collided with the specific UI object (step S130: NO), it means that the location of the HMD pointer is not appropriate (e.g., the location of the HMD pointer does not correspond to the specific UI object), and thus steps S110 and S120 may be repeated.

When the virtual beam is collided with the specific UI object (step S130: YES), an object event corresponding to the specific UI object may be performed (step S140). For example, when the contact button in FIG. 4A is clicked, a screen of the head mounted display 200 may be changed from the screen of FIG. 4A to the screen of FIG. 4B.

Although not illustrated in FIGS. 5, 6A, 6B and 6C, when a phone number input button in FIG. 4A or the add contact button in FIG. 4B is clicked, a keyboard input may be performed on a screen of the head mounted display 200. In some example embodiments, a virtual keyboard may be displayed on a screen of the head mounted display 200, any button on the virtual keyboard may be clicked using the HMD pointer, and thus the keyboard input may be performed. In other example embodiments, when the controller 250 may be a touch pad or a touch screen, a keyboard may be displayed on the touch screen, the local guide may touch any button on the keyboard, and thus the keyboard input may be performed. In this example, the image of the local space may be displayed on a screen of the head mounted display 200 to watch the keyboard on the touch screen via the head mounted display 200.

FIGS. 7A, 7B, 7C and 8 are diagrams for describing an operation of observing a remote space by a head mounted display included in a remote collaboration system according to example embodiments.

Figure 7A:
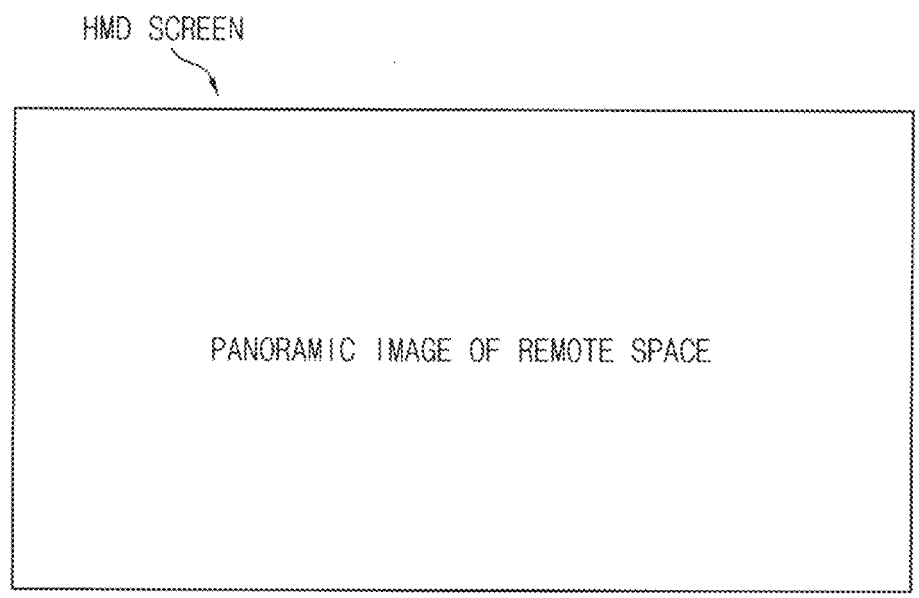
FIGS. 7A, 7B, 7C and 8 are diagrams for describing an operation of observing a remote space by a head mounted display included in a remote collaboration system according to example embodiments.
Figure 7B:
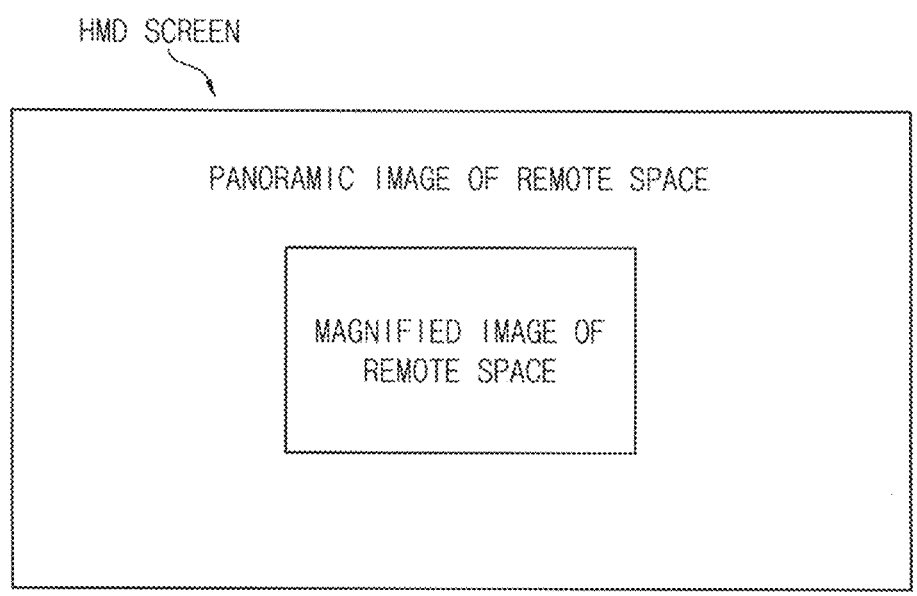
Figure 7C:
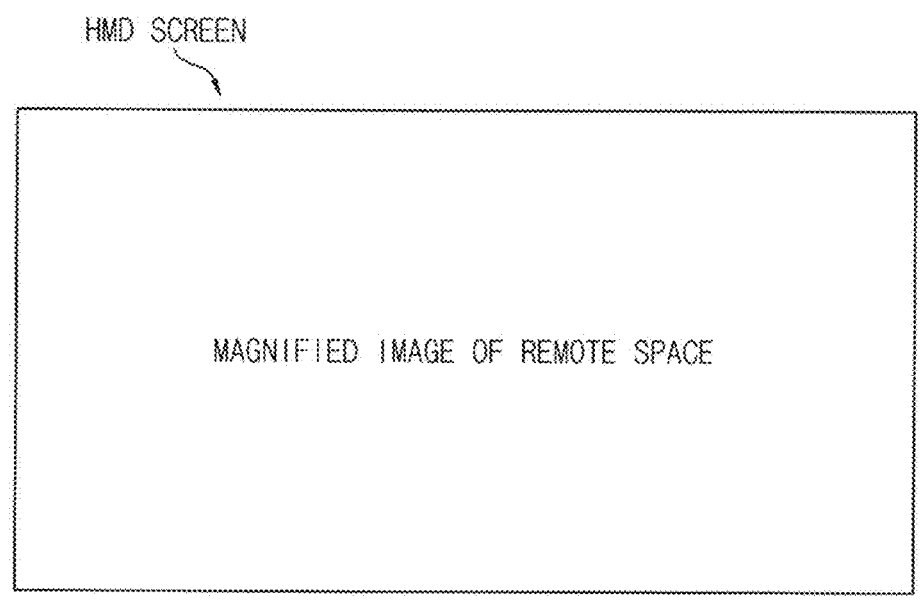

Referring to FIGS. 1, 3, 7A, 7B and 7C, after step S100 of establishing the communication between the robot device 100 and the head mounted display 200, the remote space may be observed via a screen of the head mounted display 200. For example, as illustrated in FIG. 7A, the head mounted display 200 may display the panoramic image of the remote space based on the first image information IMG1 collected by the panoramic camera 120. For another example, as illustrated in FIG. 7C, the head mounted display 200 may display the magnified image of the specific region in the remote space based on the second image information IMG2 collected by the high resolution camera 130. For still another example, as illustrated in FIG. 7B, the head mounted display 200 may display the panoramic image and the magnified image together based on the first image information IMG1 and the second image information IMG2. As will be described with reference to FIGS. 9, 10 and 11, a screen of the head mounted display 200 may be changed in response to one of various interactions.

Figure 8:
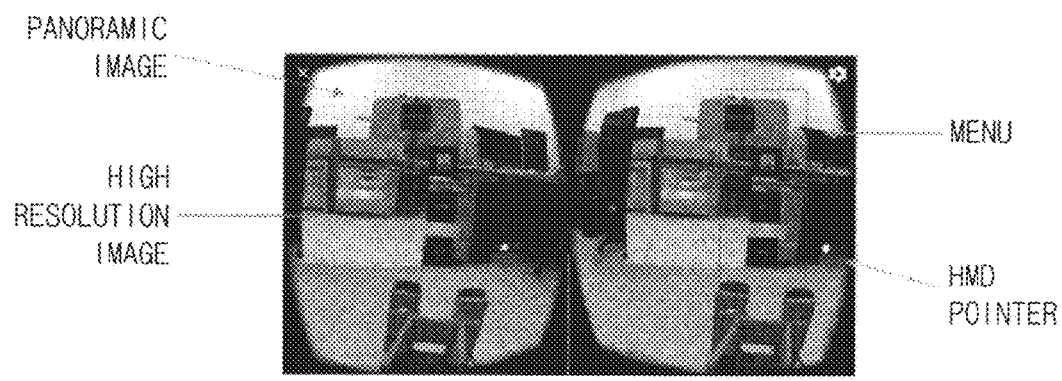

Referring to FIGS. 2 and 8, FIG. 8 illustrates an example where an image obtained from the prototype of the robot device of FIG. 2 is displayed on the head mounted display 200. In FIG. 8, the panoramic image and the magnified image (e.g., the high resolution image) are displayed together. A menu in FIG. 8 may correspond to UI objects.

Figure 9:
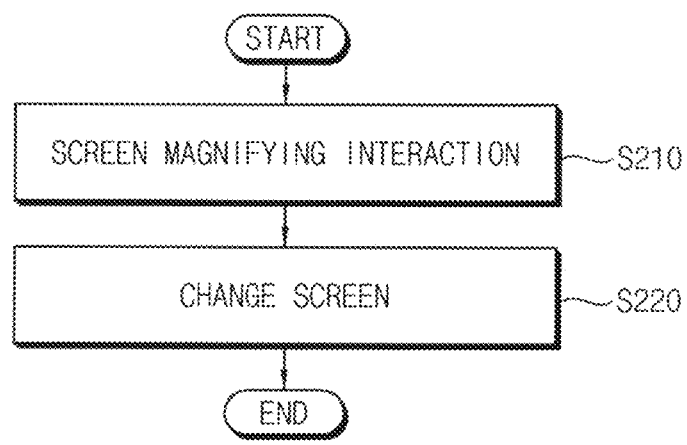
FIGS. 9, 10 and 11 are flow charts for describing an operation of changing a screen on a head mounted display included in a remote collaboration system according to example embodiments.
Figure 10:
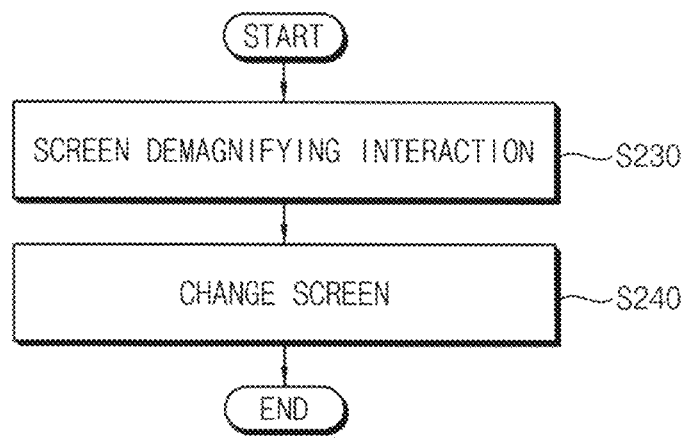
Figure 11:
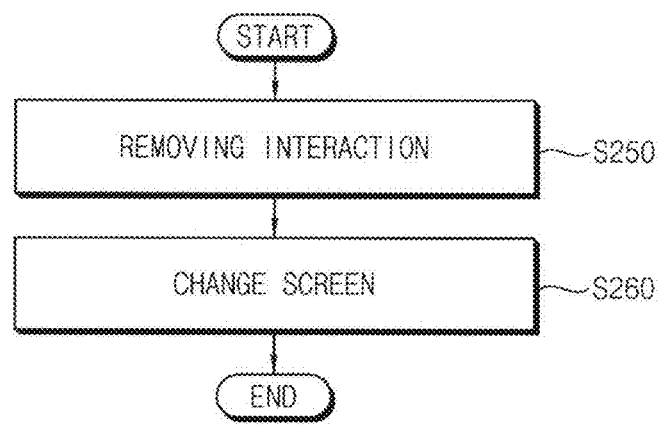

FIGS. 9, 10 and 11 are flow charts for describing an operation of changing a screen on a head mounted display included in a remote collaboration system according to example embodiments.

Referring to FIGS. 1, 3 and 9, immediately after step S100 of establishing the communication between the robot device 100 and the head mounted display 200, the head mounted display 200 may display the panoramic image as a default image or a default screen based on the first image information IMG1, as illustrated in FIG. 7A. When it is required to observe the specific region in the remote space in detail, a screen magnifying interaction may be performed (step S210), and a screen of the head mounted display 200 may be changed in response to the screen magnifying interaction (step S220).

For example, when the screen magnifying interaction is performed while the head mounted display 200 displays the panoramic image, the head mounted display 200 may display the panoramic image and the magnified image together based on the first and second image information IMG1 and IMG2, as illustrated in FIG. 7B. When the screen magnifying interaction is performed while the head mounted display 200 displays the panoramic image and the magnified image together, the head mounted display 200 may display the magnified image based on the second image information IMG2, as illustrated in FIG. 7C.

In some example embodiments, the screen magnifying interaction may be performed by the head mounted display 200. For example, when a motion of sticking a head out is performed by the head mounted display 200 (e.g., performed by the local guide), head tracking information corresponding to the motion of sticking the head out may be recognized as the screen magnifying interaction. In other example embodiments, the screen magnifying interaction may be performed by the controller 250. For example, a pinch-to-zoom motion on the touch screen or a motion of sweeping on the dedicated controller (e.g., performed by the local guide) may be recognized as the screen magnifying interaction.

Referring to FIGS. 1, 3 and 10, after the screen magnifying interaction is performed and a screen of the head mounted display 200 is changed, a screen demagnifying interaction may be performed (step S230), and the screen of the head mounted display 200 may be changed in response to the screen demagnifying interaction (step S240).

For example, when the screen demagnifying interaction is performed while the head mounted display 200 displays the panoramic image and the magnified image together, the head mounted display 200 may display the panoramic image based on the first image information IMG1. When the screen demagnifying interaction is performed while the head mounted display 200 displays the magnified image, the head mounted display 200 may display the panoramic image and the magnified image together based on the first and second image information IMG1 and IMG2.

In addition, when the screen demagnifying interaction is performed while the head mounted display 200 displays the panoramic image, the head mounted display 200 may display the image of the local space based on the third image information collected by the camera 210.

In other words, the screen of the head mounted display 200 may be changed in response to the screen magnifying interaction in the order of the image of the local space, the panoramic image of the remote space, the mixed image (e.g., the panoramic image and the magnified image together) of the remote space and the magnified image of the remote space. The screen of the head mounted display 200 may be changed in response to the screen demagnifying interaction in the order of the magnified image of the remote space, the mixed image of the remote space, the panoramic image of the remote space and the image of the local space.

Referring to FIGS. 1, 3 and 11, while the head mounted display 200 displays the panoramic image and the magnified image together, a removing interaction may be performed (step S250), and a screen of the head mounted display 200 may be changed in response to the removing interaction (step S260).

For example, when the removing interaction is performed while the head mounted display 200 displays the panoramic image and the magnified image together, the head mounted display 200 may only display the panoramic image based on the first image information IMG1. In other words, the magnified image may be instantaneously removed in response to the removing interaction, and the screen of the head mounted display 200 may be changed from a screen including the panoramic image and the magnified image together to a screen including the panoramic image only.

In some example embodiments, the removing interaction may be performed by the head mounted display 200. For example, when a motion of tilting a head to the left or right is performed by the head mounted display 200 (e.g., performed by the local guide), head tracking information corresponding to the motion of tilting the head to the left or right may be recognized as the removing interaction. In other example embodiments, the removing interaction may be performed by the controller 250.

In some example embodiments, the removing interaction may be used for removing a user interface object displayed on the head mounted display 200. For example, while the panoramic image is displayed on the head mounted display 200, while the magnified image is displayed on the head mounted display 200, or while the panoramic image and the magnified image are is displayed on the head mounted display 200 together, the user interface object for controlling an operation of the head mounted display 200 may be displayed on the screen of the head mounted display 200. For example, the menu may be displayed with the panoramic image and the magnified image on the screen of the head mounted display 200, as illustrated in FIG. 8. In this case, the removing interaction may be performed (step S250), and the user interface object may be removed from the screen of the head mounted display 200 in response to the removing interaction (step S260).

Although not illustrated in FIG. 11, after the removing interaction is performed, a restoring interaction may be performed, and the removed magnified image and/or the removed user interface object may be restored on the screen of the head mounted display 200.

In some example embodiments, while various interactions described with reference to FIGS. 9, 10 and 11 are performed, a screen saving interaction may be performed to store information associated with the remote space, and a current screen image displayed on the head mounted display 200 may be stored in response to the screen saving interaction. For example, the current screen image may be stored in the head mounted display 200 as a static image (e.g., a still image, a stopped image, etc.) or a dynamic image (e.g., a video, a moving image, etc.).

Figure 12:
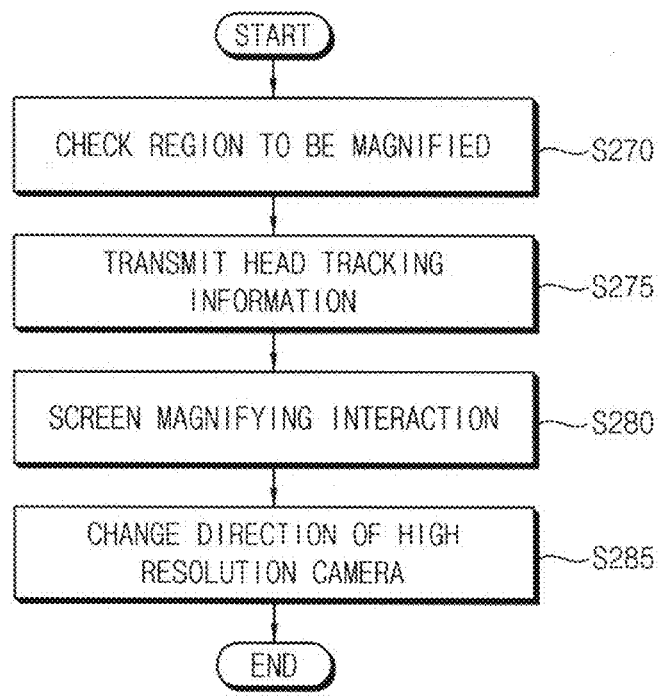
FIG. 12 is a flow chart for describing an operation of controlling a robot device performed by a head mounted display included in a remote collaboration system according to example embodiments.

FIG. 12 is a flow chart for describing an operation of controlling a robot device performed by a head mounted display included in a remote collaboration system according to example embodiments.

Referring to FIGS. 1, 3 and 12, the head mounted display 200 may check the specific region to be magnified in the panoramic image (step S270). To obtain the magnified image of the specific region, head tracking information collected by the head mounted display 200 may be transmitted to the robot device 100 (step S275). When the screen magnifying interaction described with reference to FIG. 9 is performed (step S280), a direction of the high resolution camera 130 may be controlled toward the specific region in the remote space based on the head tracking information and the screen magnifying interaction (step S285). In addition, a direction of the projector 110 may be further controlled toward the specific region in the remote space. The high resolution camera 130 and the projector 110 may be controlled or driven independently (e.g., separately).

Figure 13:
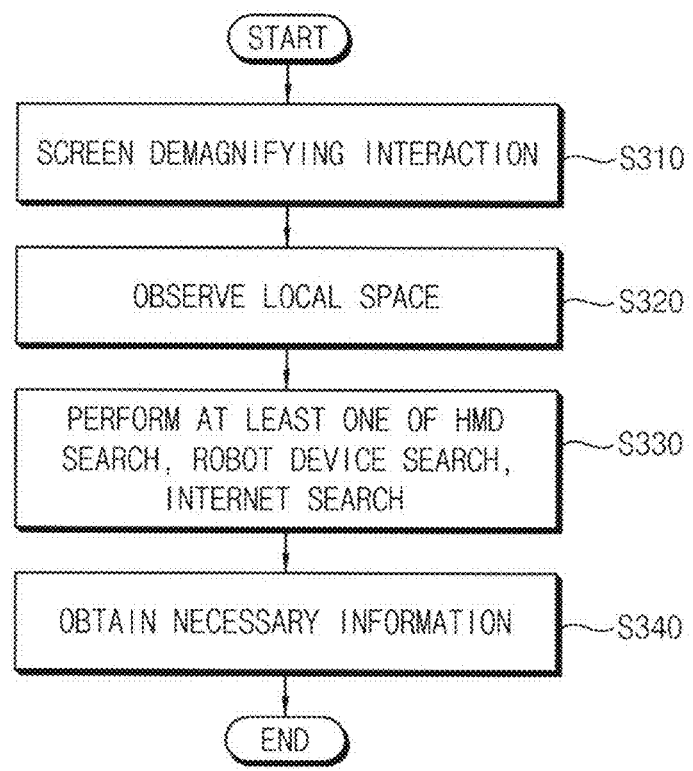
FIG. 13 is a flow chart for describing an operation of searching information performed by a head mounted display included in a remote collaboration system according to example embodiments.

FIG. 13 is a flow chart for describing an operation of searching information performed by a head mounted display included in a remote collaboration system according to example embodiments.

Referring to FIGS. 1, 3 and 13, to search the necessary information RI, the screen demagnifying interaction described with reference to FIG. 10 may be performed (step S310) while the head mounted display 200 displays the panoramic image. The head mounted display 200 may display the image of the local space based on the third image information collected by the camera 210 in response to the screen demagnifying interaction to observe the local space (step S320).

In addition, at least one of a first searching operation performed on a plurality of first data stored in the head mounted display 200, a second searching operation performed on a plurality of second data stored in the robot device 100, and a third searching operation performed on a plurality of third data associated with the necessary information RI by connecting an Internet network via the head mounted display 200 may be additionally performed (step S330).

The necessary information RI may be obtained based on at least one of the result of observing the remote space, a result of observing the local space, a result of the first searching operation, a result of the second searching operation and a result of the third searching operation (step S340).

In some example embodiments, at least one of observing the local space, the first searching operation, the second searching operation and the third searching operation may be omitted.

Figure 14A:
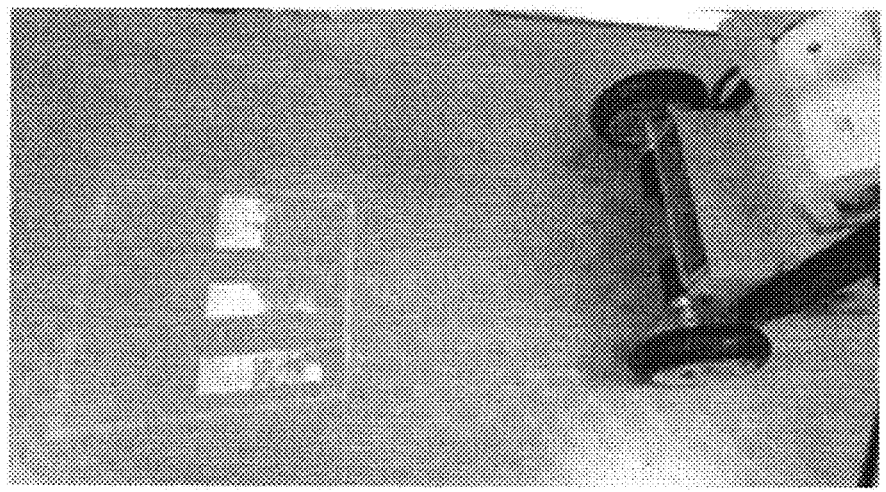
FIGS. 14A, 14B and 14C are diagrams for describing an operation of displaying necessary information performed by a robot device included in a remote collaboration system according to example embodiments.
Figure 14B:
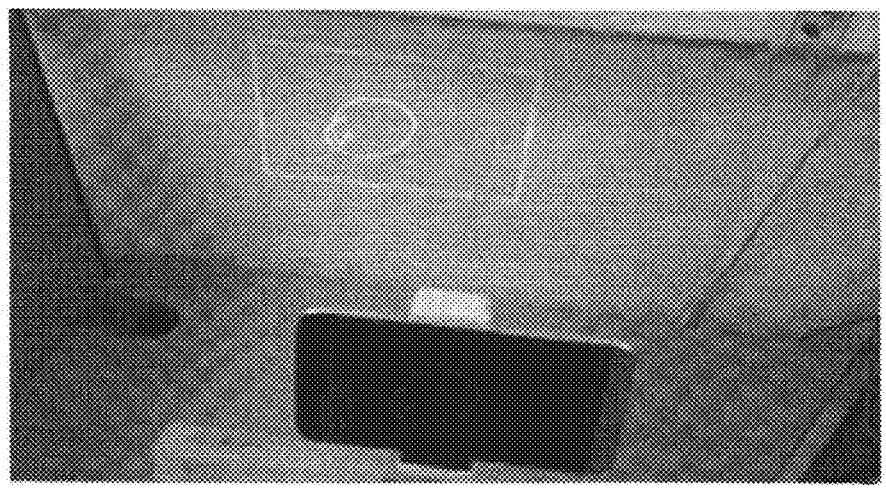
Figure 14C:
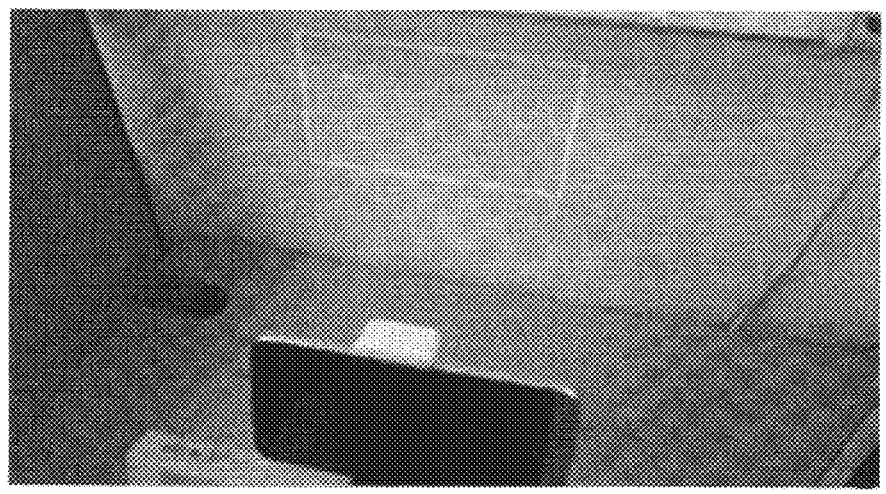

FIGS. 14A, 14B and 14C are diagrams for describing an operation of displaying necessary information performed by a robot device included in a remote collaboration system according to example embodiments.

Referring to FIGS. 14A and 14B, when the necessary information RI is provided as an image, the projector 110 may display the necessary information RI on the remote space. For example, when the necessary information RI corresponds to a static image or a dynamic image as illustrated in FIG. 14A, or when the necessary information RI corresponds to a sketch image (e.g., a drawing image) as illustrated in FIG. 14B, the projector 110 may display the image on the remote space. For example, the image may be selected and transmitted by pushing a send button or based on a drag-and-drop scheme. A position of the image may be controlled according to eyes of the remote user.

Referring to FIG. 14C, when the necessary information RI is associated with the specific region in the remote space, the projector 110 may display a projector pointer on the specific region in the remote space. For example, a movement of the projector pointer on the specific region in the remote space may be performed by moving the HMD pointer by the controller 250. For another example, the sketch image in FIG. 14B may be drawn by moving the HMD pointer.

As described above, the remote interaction method (e.g., the remote collaboration) performed by the remote collaboration system 10 according to example embodiments may include four steps of establishing the communication between the robot device 100 and the head mounted display 200, observing the problems in the remote space, searching the information for resolving the problems, and explaining solution of the problems. Interactions in each step will be synthetically described with detailed examples.

In an initial operation time, to perform the interactions according to example embodiments, the local guide in the local space wears the head mounted display 200 and controls the robot device 100 disposed in the remote space. The interactions in each step are performed based on the controls of the HMD and the remote collaboration device as described above.

First, in the step of establishing the communication, the local guide clicks the contact list on the screen of the head mounted display 200 using the controller 250 to call the remote user. Alternatively, the local guide clicks the phone number input menu and inputs a phone number using a keyboard (e.g., a virtual keyboard) to call the remote user. An alarm indicating a call from the local guide rings or sounds in the robot device 100, and the remote user clicks a call button on the robot device 100 to answer the call.

Next, in the step of observing the problems in the remote space, after the communication between the robot device 100 and the head mounted display 200 is established, the local guide watches or observes the panoramic image of the remote space transmitted from the robot device 100 via the head mounted display 200. When it is required to observe the specific region in the remote space in detail, the local guide performs the screen magnifying interaction to watch or observe the magnified image of the specific region in the remote space. The local guide captures the magnified image or records the image and/or voice to store information associated with the remote space.

For example, in a situation where the local guide helps the remote user to assemble home appliances, the remote space (or the remote environment) is observed by the local guide using the head mounted display 200, and the screen magnifying interaction is performed to display the magnified image (or the high resolution image) and observe components of the home appliances in detail. The screen capture is performed to save the current screen image for reference before searching the necessary information RI.

Next, in the step of searching the information for resolving the problems, it is required to obtain the information for resolving the problems after the problems in the remote space are checked. The information may exist in the remote space, the remote collaboration device (e.g., the robot device 100), the head mounted display 200, the local space, the Internet network, etc. Types of the information may include images, videos, texts, documents, etc. Information stored in the device is displayed, selected and transmitted based on HMD interactions and GUIs associated with images and/or videos. Information in the remote space is searched and captured based on the panoramic image and the magnified image. The screen demagnifying interaction is performed to display the image of the local space, and information in the local space is searched and captured based on the image of the local space. Information in the Internet network is displayed, searched and transmitted based on the Internet browser, the web surfing, the website capture, etc.

For example, in a situation where manuals or specifications for assembling the home appliances are located in the local space, the manuals or the specifications in the local space are observed by the local guide using the head mounted display 200 and the screen demagnifying interaction. When the information is found out in the manuals or the specifications, the screen saving interaction is performed to store or capture the current screen image. The captured image is transmitted to the robot device 100.

Finally, in the step of explaining the solution of the problems, it is performed to provide the solution of the problems to the remote space and the remote user using the projector 110 after the remote space is observed and the information for resolving the problems is obtained. Types of explaining the solution of the problems may include pointing, sketching, transmitting of the images and/or the videos, etc. The pointing and the sketching are performed to display the projector pointer and the sketch image on the remote space based on an accurate portion seen by the local guide. The transmitting of the images and/or the videos is performed to display the images and/or the videos on a desired portion in the remote space based on the drag-and-drop scheme. In addition, the displayed solution is stored, the displayed solution disappears when the direction of the projector 110 is changed, and the disappeared solution appears again when the direction of the projector 110 is returned to the original direction.

For example, the captured image of the manuals or the specifications is displayed on the screen (e.g., the UI screen) of the head mounted display 200 as a thumbnail. The captured image is selected, dragged and dropped on the desired portion in the remote space by the local guide using the HMD pointer, and the captured image is displayed on the remote space using the projector 110.

The remote collaboration system 10 according to example embodiments may include the robot device 100 with the projector and the at least one camera and the head mounted display 200 (e.g., HMD interface) controlling the robot device 100. The camera functions may be performed to capture the 360 degree image (or the panoramic image) of the remote space and the high resolution image (or the magnified image) of the specific region in the remote space. The robot device 100 may include a single camera for capturing both the 360 degree image and the high resolution image or two cameras (e.g., the panoramic camera 120 and the high resolution camera 130) for capturing the 360 degree image and the high resolution image, respectively. The robot device 100 may further include the motor for controlling the high resolution camera, and the direction of the high resolution camera may be controlled when the screen is changed from the 360 degree image to the high resolution image. The robot device 100 may further include the motor for controlling the projector. The robot device 100 may further include the computer for communications and computations, and the wheels and the battery for a moveable robot device.

The HMD interface may be implemented with a video see-through, an optical see-through, etc. The interaction interface may be implemented with a touch pad, a dedicated control unit, etc. The touch pad may be familiar with many users, may be used with various gestures, and may be utilized such as a keyboard. The dedicated control unit may include a sensor for tracking a movement of the dedicated control unit, buttons, a touch pad, etc., may provide an intuitive user experience, and may be useful for a 3D input. A keyboard input may be further implemented.

In the remote collaboration system 10 according to example embodiments, the local guide may wear the head mounted display 200 and may communicate with the remote user using the screen GUIs of the head mounted display 200 and the interaction interface. The head mounted display 200 may exchange image, video and/or voice data with the robot device 100, and may transmit information and data for controlling the motor to the robot device 100. The robot device 100 may move by the control of the local guide and the head mounted display 200, and may display the information using the projector 110. All data may be transmitted via the computer.

The inventive concept may be applied to various remote coaching services where the remote user in the remote space do not know how to handle some devices (e.g., electronic devices) or has some problems and the local guide in the local space provides assistance to the remote user to resolve the problems. For example, the inventive concept may be applied to various examples such as teaching a computer in which a computer screen is captured by the robot device and explanations are provided via the projector, playing a Korean chess with the local guide in which the projector pointer is displayed on a Korean chessboard, and showing a way to destination in which the destination and a current location are displayed on a map. For another example, the inventive concept may be applied to various examples such as cooking, educating, gardening, repairing, styling, interior designing, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A remote interaction method for providing a remote collaboration system, the system comprising a robot device and a head mounted display, the robot device comprising a projector, a panoramic camera and a high resolution camera, and the robot device and the head mounted display being located space apart from each other, the method comprising:

in response to receipt of a communication request, establishing a communication between the robot device and the head mounted display;

observing, by the head mounted display, a remote space based on first image information and second image information, the first image information, corresponding to panoramic image of the remote space, being collected by the panoramic camera, the second image information, corresponding to a high resolution image or a magnified image of a region in the remote space, being collected by the high resolution camera, and the first and second image information being transmitted from the robot device, wherein observing the remote space is performed by following steps:

displaying, by the head mounted display, a panoramic image of the remote space based on the first image information, in response to detection of a screen magnifying interaction while the head mounted display displaying the panoramic image, displaying, by the head mounted display, the panoramic image and a magnified image of a first region in the remote space together based on the first image information and the second image information, in response to detection of the screen magnifying interaction while the head mounted display displaying the panoramic image and the magnified image together, displaying, by the head mounted display, the magnified image based on the second image information, in response to detection of a screen demagnifying interaction, while the head mounted display displaying the panoramic image and the magnified image together, displaying, by the head mounted display, the panoramic image based on the first image information, and in response to detection of the screen demagnifying interaction, while the head mounted display displaying the magnified image, displaying, by the head mounted display, the panoramic image and the magnified image together based on the first image information and the second image information;

searching, by the head mounted display, necessary information to be provided to the remote space based on a result of observing the remote space; and providing, by the robot device, the necessary information received from the head mounted display to the remote space using the projector.

2. The remote interaction method of claim 1, wherein observing the remote space further comprises:

removing the magnified image displayed on the head mounted display when a removing interaction is performed while the head mounted display displays the panoramic image and the magnified image together, or a user interface object displayed on the head mounted display when the removing interaction is performed while the head mounted display displays the panoramic image or the magnified image with the user interface object, the user interface object being used for controlling an operation of the head mounted display.

3. The remote interaction method of claim 1, wherein searching the necessary information comprises:

in response to detection of a screen demagnifying interaction is performed while the head mounted display displays the panoramic image, observing, by the head mounted display, the local space based on third image information collected by a first camera included in the head mounted display;

performing a first searching operation on a plurality of first data stored in the head mounted display; and obtaining the necessary information based on at least one of the result of observing the remote space, a result of observing the local space and a result of the first searching operation.

4. The remote interaction method of claim 3, wherein searching the necessary information further comprises:

performing a second searching operation on a plurality of second data stored in the robot device; and performing a third searching operation on a plurality of third data associated with the necessary information by connecting an Internet network via the head mounted display, and wherein the necessary information is obtained further based on at least one of a result of the second searching operation and a result of the third searching operation.

5. The remote interaction method of claim 1, wherein providing the necessary information to the remote space comprises:

in response to detection of the necessary information being provided as an image displaying, by the projector, the necessary information on the remote space; and in response to detection of the necessary information being associated with the first region in the remote space, displaying, by the projector, a pointer on the first region in the remote space.

6. The remote interaction method of claim 5, wherein both the high resolution camera and the projector are controlled toward the first region in the remote space in response to detection of the head mounted display displaying the panoramic image and the magnified image together or only the magnified image and in response to detection of the necessary information being associated with the first region in the remote space and the projector displaying the pointer on the first region in the remote space.

7. The remote interaction method of claim 6, wherein the remote collaboration system further comprises a controller that is located in the local space and controls an operation of the head mounted display, wherein direction controls of the high resolution camera and the projector are performed based on head tracking information obtained by the head mounted display, and wherein a movement of the pointer displayed on the first region in the remote space is controlled by the controller.

8. A remote collaboration system comprising:

a robot device located in a remote space and comprising a projector, a panoramic camera and a high resolution camera, the projector being configured to provide necessary information to the remote space, the panoramic camera being configured to collect first image information of the remote space, the high resolution camera being configured to collect second image information of the remote space; and a head mounted display located in a local space apart from the remote space, wherein in response to receipt of a communication request, a communication between the robot device and the head mounted display is established, the head mounted display observes the remote space based on the first image information and the second image information, the first image information corresponding to panoramic image of the remote space being collected by the panoramic camera and the second image information corresponding to a high resolution image or a magnified image of a region in the remote space being collected by the high resolution camera, and the first and second image information being transmitted from the robot device, and the head mounted display searches the necessary information based on a result of observing the remote space, and the robot device provides the necessary information received from the head mounted display to the remote space using the projector, and wherein observing the remote space is performed by:

the head mounted display displays the panoramic image of the remote space based on the first image information, in response to detection of a screen magnifying interaction while the head mounted display displaying the panoramic image, the head mounted display displays a panoramic image and a magnified image of a first region in the remote space together based on the first image information and the second image information, in response to detection of the screen magnifying interaction while the head mounted display displaying the panoramic image and the magnified image together, the head mounted display displays the magnified image based on the second image information, in response to detection of a screen demagnifying interaction, while the head mounted display displaying the panoramic image and the magnified image together, the head mounted display displays the panoramic image based on the first image information, and in response to detection of the screen demagnifying interaction, while the head mounted display displaying the magnified image, the head mounted display displays the panoramic image and the magnified image together based on the first image information and the second image information.

* * * * *